United States Patent
Akemi et al.

(10) Patent No.: US 7,754,235 B2
(45) Date of Patent: Jul. 13, 2010

(54) ADHESIVE AND LAMINATE

(75) Inventors: Hitoshi Akemi, Ibaraki (JP); Keigo Inosaka, Ibaraki (JP); Junichi Sekiya, Ibaraki (JP); Junichi Saito, Ibaraki (JP); Yoshifumi Hosaka, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 964 days.

(21) Appl. No.: 11/410,003

(22) Filed: Apr. 25, 2006

(65) Prior Publication Data

US 2006/0246281 A1 Nov. 2, 2006

(30) Foreign Application Priority Data

Apr. 28, 2005 (JP) ............... 2005-131670

(51) Int. Cl.
  *A61F 13/02* (2006.01)
  *B32B 27/30* (2006.01)
  *C09D 5/02* (2006.01)

(52) U.S. Cl. ............ 424/448; 424/449; 524/556

(58) Field of Classification Search ........ 424/448, 424/449; 524/556
See application file for complete search history.

(56) References Cited

U.S. PATENT DOCUMENTS

| | | | | |
|---|---|---|---|---|
| 6,146,656 A | * | 11/2000 | Hori et al. | ............... 424/448 |
| 6,624,273 B1 | * | 9/2003 | Everaerts et al. | .......... 526/317.1 |
| 7,056,526 B2 | * | 6/2006 | Kuroda et al. | ............... 424/443 |
| 2003/0049440 A1 | | 3/2003 | Kuroda et al. | |

FOREIGN PATENT DOCUMENTS

| | | |
|---|---|---|
| CN | 1406634 | 4/2003 |
| EP | 1 454 928 | 9/2004 |
| JP | 03-112558 | 5/1991 |
| JP | 03-127725 | 5/1991 |
| JP | 03-39485 | 6/1991 |
| JP | 10025460 A * | 1/1998 |
| JP | 2004210973 A * | 7/2004 |

OTHER PUBLICATIONS

JP 10025460A, Jan. 1998, Terachi et al., Machine translation.*
Database WPI Section Ch, Week 200457, Derwent Publications Ltd., AN 2004-584081, XP-002389237 & JP 2004-210973, Jul. 29, 2004.

* cited by examiner

*Primary Examiner*—Satya B Sastri
(74) *Attorney, Agent, or Firm*—Wenderoth, Lind & Ponack, L.L.P.

(57) ABSTRACT

The present invention provides an adhesive capable of affording an adhesive layer showing reduced stickiness, reduced cohesive failure and the like. An adhesive containing a copolymer obtained by copolymerizing monomers containing a (meth)acrylic acid alkyl ester as a main component, and a vinyl monomer having a hydroxyl group and/or a carboxyl group and which has an average molecular radius of not less than 70 nm as measured by a multi angle laser light scattering method.

9 Claims, 1 Drawing Sheet

ADHESIVE AND LAMINATE

TECHNICAL FIELD OF THE INVENTION

The present invention relates to an adhesive and a laminate comprising an adhesive layer comprising the adhesive.

BACKGROUND OF THE INVENTION

Conventionally, laminates such as adhesive tapes, adhesive sheets and the like are widely used for adhesion to various surfaces to be adhered to such as metal, glass, lumber, paper, cardboard, plastic and the like. For example, external pharmaceutical preparations can be mentioned, wherein a drug is transdermally administered from the skin surface by adhering, to the skin, an adhesive sheet comprising a pressure-sensitive adhesive layer comprising a drug and laminated on a support such as plastic film, non-woven fabric, woven fabric, foil, composite films thereof and the like. As an adhesive constituting a pressure-sensitive adhesive layer, various kinds of polymer substances are used. In view of the adhesiveness and various chemical properties, a number of acrylic adhesives containing an acrylic copolymer have been widely used (JP-B-03-39485, JP-A-03-112558 and JP-A-03-127725).

The advantages of the acrylic adhesives are that various properties can be expressed by changing the composition of copolymer, and the solubility of drug and compatibility of additive can be designed to a certain extent. In addition, introduction of a functional group into a copolymer forms a chemical crosslinking point, and a crosslinking treatment can markedly increase the amounts of the pharmaceutical agent and additives to be added.

SUMMARY OF THE INVENTION

Even when an adhesive sheet has an adhesive layer obtained by introducing a sufficient crosslinking point into a copolymer, adding a crosslinking agent and applying a crosslinking treatment as mentioned above, serious inconveniences such as stickiness, cohesive failure and the like may sometimes occur after adhesion. The reasons therefore are considered to be the molecular weight of a copolymerization product and the kind of a crosslinking agent. According to the finding of the present inventors, however, the aforementioned inconveniences may occur despite the use of a copolymer having an evidently large molecular weight and a sufficient crosslinking point, because sufficient cohesion cannot be achieved. As the situation stands, the cause has not been elucidated.

The present invention has been made in view of such situation, and the problems to be solved are provision of an adhesive capable of affording an adhesive layer suppressed in the stickiness, cohesive failure and the like and a laminate using the same.

The present inventors have conducted intensive studies to solve the above-mentioned problems and found that the cause of the aforementioned stickiness, cohesive failure and the like is the size of the molecule, or a molecular radius, of the copolymer constituting the adhesive, which resulted in the completion of the present invention.

Accordingly, the present invention provides the following.

(1) An adhesive comprising a copolymer obtained by copolymerizing monomers comprising a (meth)acrylic acid alkyl ester as a main component, and a vinyl monomer having a hydroxyl group and/or a carboxyl group and which has an average molecular radius of not less than 70 nm as measured by a multi angle laser light scattering method.

(2) The adhesive of the above-mentioned (1), wherein the above-mentioned (meth)acrylic acid alkyl ester is 2-ethylhexyl acrylate.

(3) The adhesive of the above-mentioned (1) or (2), wherein the above-mentioned vinyl monomer is 2-hydroxyethyl (meth)acrylate or (meth)acrylic acid.

(4) The adhesive of the above-mentioned (1), wherein the above-mentioned copolymer is obtained by copolymerizing monomers comprising not less than 50 wt % of (meth)acrylic acid alkyl ester, 10-40 wt % of N-vinyl-2-pyrrolidone, and 1-10 wt % of an acrylic acid.

(5) The adhesive of any of the above-mentioned (1)-(4), which comprises 100 parts by weight of a plasticizer and 0.3-0.7 part by weight of a crosslinking agent, per 100 parts by weight of the above-mentioned copolymer, wherein a laminate comprising the adhesive layer comprising the adhesive on a support shows a retention time as measured by the following method (A) of not less than 1000 min after a heat treatment at 70° C. for 48 hr:

(A) a laminate after heat treatment is cut to give a test piece (width 10 mm, length 50 mm), 10 mm from one end of the test piece is adhered to a bakelite plate and pressed by one reciprocation of a rubber roller (0.85 kg), a 2.94 N (0.3 kgf) load is applied to the tip of the other end at 40° C. in the shear direction, and the time until the test piece falls off due to cohesive failure or interfacial failure is measured.

(6) The adhesive of any of the above-mentioned (1)-(4), which comprises 100 parts by weight of a plasticizer and 0.3-0.5 part by weight of a crosslinking agent, per 100 parts by weight of the above-mentioned copolymer, wherein a laminate comprising the adhesive layer comprising the adhesive on a support shows a retention time as measured by the following method (A) of not less than 1000 min after a heat treatment at 70° C. for 48 hr:

(A) a laminate after heat treatment is cut to give a test piece (width 10 mm, length 50 mm), 10 mm from one end of the test piece is adhered to a bakelite plate and pressed by one reciprocation of a rubber roller (0.85 kg), a 2.94 N (0.3 kgf) load is applied to the tip of the other end at 40° C. in the shear direction, and the time until the test piece falls off due to cohesive failure or interfacial failure is measured.

(7) The adhesive of the above-mentioned (5) or (6), wherein the above-mentioned crosslinking agent is a multifunctional isocyanate compound or a polyvalent metal chelate compound.

(8) A laminate comprising a support made of a flexible material and an adhesive layer formed on at least one side of the support and comprising the adhesive of any of the above-mentioned (1)-(7).

(9) The laminate of the above-mentioned (8), wherein the above-mentioned adhesive layer comprises 100 parts by weight of a plasticizer and 0.3-0.7 part by weight of a crosslinking agent per 100 parts by weight of the copolymer contained in the adhesive layer, and the retention time as measured by the following method (A) after a heat treatment at 70° C. for 48 hr is not less than 1000 min:

(A) a laminate after heat treatment is cut to give a test piece (width 10 mm, length 50 mm), 10 mm from one end of the test piece is adhered to a bakelite plate and pressed by one reciprocation of a rubber roller (0.85 kg), a 2.94 N (0.3 kgf) load is applied to the tip of the other end at 40° C. in the shear direction, and the time until the test piece falls off due to cohesive failure or interfacial failure is measured.

(10) The laminate of the above-mentioned (8), wherein the above-mentioned adhesive layer comprises 100 parts by weight of a plasticizer and 0.3-0.5 part by weight of a crosslinking agent per 100 parts by weight of the copolymer contained in the adhesive layer, and the retention time as measured by the following method (A) after a heat treatment at 70° C. for 48 hr is not less than 1000 min:

(A) a laminate after heat treatment is cut to give a test piece (width 10 mm, length 50 mm), 10 mm from one end of the test piece is adhered to a bakelite plate and pressed by one reciprocation of a rubber roller (0.85 kg), a 2.94 N (0.3 kgf) load is applied to the tip of the other end at 40° C. in the shear direction, and the time until the test piece falls off due to cohesive failure or interfacial failure is measured.

(11) The laminate of any of the above-mentioned (8)-(10), which is an adhesive sheet or an adhesive tape.

Since the adhesive of the present invention comprises a copolymer having an average molecular radius of not less than a given value, an adhesive layer formed using this can have a sufficiently increased cohesion. As a result, the stickiness, cohesive failure, interfacial failure and the like of the adhesive layer can be suppressed.

DETAILED DESCRIPTION OF THE INVENTION

Figure 1:
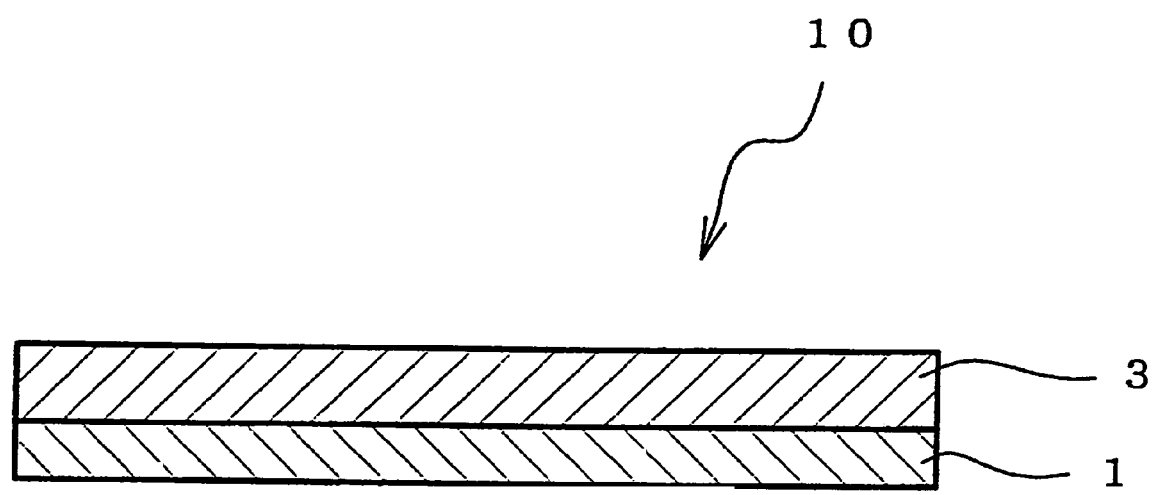
FIG. 1 is a sectional view showing one embodiment of the laminate of the present invention.

The present invention is explained in detail in the following by referring to a preferable embodiment thereof, wherein the size ratio of the FIGURE does not necessarily match that indicated in the explanation.

The adhesive of the present invention is now explained. The adhesive of the present invention characteristically comprises a copolymer obtained by copolymerizing monomers comprising a (meth)acrylic acid alkyl ester as a main component, and a vinyl monomer having a hydroxyl group and/or a carboxyl group (hereinafter to be simply referred to as a "vinyl monomer") and which has an average molecular radius of not less than 70 nm as measured by a multi angle laser light scattering method.

In the present specification, the "average molecular radius" means an average molecular radius (Rz) of a copolymer, which is measured under the following conditions using a multi angle laser light scattering detector. The "absolute molecular weight" means an absolute molecular weight (Mw) of a copolymer as measured under the following conditions using a multi angle laser light scattering detector, as with the aforementioned Rz. The detail of the principle of the measurement of Rz and Mw and the like is as described in Polymer, General Polymer Experiments, KYORITSU SHUPPAN CO., LTD.

GPC: Shodex, SYSTEM•21,
MALLS detector: Wyatt Technology, DAWN DSP-F,
column: stainless tube (inner diameter 0.25 mm, length 80 cm) (GPC column is not used),
column temperature: 35° C.,
eluent: THF,
flow rate: 0.70 mL/min,
injection volume: 4 mL
laser wavelength: 632.8 nm
line filter: 1.0 μm
multi angle fitting method: Berry method While a copolymer has an Rz of not less than 70 nm, it is preferably not less than 80 nm, more preferably not less than 90 nm, from the aspects of suppression of stickiness, cohesive failure and the like. Since a copolymer having an Rz exceeding 1 μm shows properties (e.g., cohesion etc.) essentially different from those of the copolymer in the present invention, the upper limit of Rz is preferably not more than 1 μm. From the similar viewpoints as mentioned above, Mw of the copolymer is preferably 1,000,000-3,000,000, more preferably 1,500,000-2,500,000. In the present invention, when the Rz and Mw of the copolymer are within the above-mentioned ranges, inconvenience such as stickiness, cohesive failure and the like can be prevented more certainly.

The copolymer constituting the adhesive of the present invention can be produced by general radical solution polymerization. To give a copolymer having the aforementioned Rz and Mw, given conditions of the kind of solvent, monomer concentration, initiator concentration, polymerization temperature and the like in the polymerization reaction are necessary. While the reaction conditions vary depending on the kind of monomer and ratio thereof, for example, the initiator concentration is 0.1-0.6 wt % (preferably 0.12-0.45 wt %) of the total weight of the monomer, and the concentration of the initially charged monomer during polymerization is 25-85 wt % (preferably 30-80 wt %) of the whole weight of the solution. The molecular weight and molecular radius can be increased by raising the initially charged concentration. Depending on the kind of monomer, however, an increased charged concentration makes control of the polymerization reaction difficult. When a monomer having high homopolymerizability is used in a large amount, a three-dimensional network formation reaction can be prevented by decreasing the initially charged concentration. As the solvent, acetic acid esters such as ethyl acetate, propyl acetate, butyl acetate and the like, saturated hydrocarbons such as heptane and the like, and the like are preferable and, from the aspects of fine polymerization reaction and easy removal by drying, ethyl acetate is particularly preferable. Since aromatic hydrocarbons such as toluene, benzene, xylene and the like, alcohols such as methanol, ethanol and the like, and the like are unsuitable as solvents since they have large chain transfer constant.

As the initiator, both organic peroxide initiators and azo initiators can be used. As the organic peroxide initiator, peroxy carbonate, ketone peroxide, peroxy ketal, hydroperoxide, dialkyl peroxide (lauroyl peroxide, benzoyl peroxide (BPO) etc.), diacyl peroxide, peroxy ester and the like can be mentioned, with preference given to BPO. As the azo initiator, 2,2'-azobisisobutyronitrile (AIBN), 2,2'-azobis(2-methylbutyronitrile), 2,2'-azobis(2,4-dimethylvaleronitrile), methyl 2,2'-azobisisobutyrate and the like can be mentioned, with preference given to AIBN. They can be used alone or in a combination of two or more kinds thereof.

Since control of the reaction in the initial stage of polymerization reaction greatly affects the adhesion, cohesion etc. of the final adhesive, the polymerization reaction is desirably performed in multiple steps. While the temperature of the initial polymerization reaction (hereinafter "first polymerization reaction") is appropriately determined in consideration of the decomposition rate of the initiator to be used and the like. Depending on the initiator, when the reaction temperature is too high, the decomposition rate of the initiator becomes too fast and control of the reaction in the initial stage of the polymerization reaction may become difficult. Therefore, the polymerization reaction is preferably carried out with the 10 hr half-life temperature of the initiator as a measure and a temperature of not higher than that. As long as the temperature is not higher than the 10 hr half-life temperature of the initiator, a suitable reaction temperature can be determined in consideration of the kind of monomer, control of reaction, properties to be imparted to an adhesive and the like. To make the polymerization temperature not higher than the 10 hr half-life temperature, adjustment by dropwise addition of solvent, cooling of outer bath, stirring speed and the like is preferable. The initiator may be added at once at the start of the polymerization reaction or added in several times (including the start of the reaction) during the first polymerization reaction.

The time point when the reaction becomes mild is taken as an end point of the first polymerization reaction, and the polymerization reaction (hereinafter to be referred to as a "second polymerization reaction") is continued at an increased reaction temperature for the reduction of a residual monomer. In the second polymerization reaction, by setting the reaction temperature higher than in the first polymerization reaction, the decomposition rate of the initiator and the rate of reaction with a monomer become higher, and the residual monomer is efficiently reduced. The temperature of the second polymerization reaction is higher than the 10 hr half-life temperature and lower than the boiling point of the solvent. To achieve such a polymerization temperature, adjustment by dropwise addition of solvent, cooling of outer bath, stirring speed and the like is preferable. The second polymerization reaction is carried out until the initiator is deactivated. A rough guide of the time up to the deactivation of the initiator is, for example, the time after subtracting the time necessary for the first polymerization reaction from 10 hours.

After the completion of the second polymerization reaction, a polymerization reaction (hereinafter to be referred to as a "third polymerization reaction") is continued at an increased reaction temperature higher than that of the second polymerization reaction and lower than the boiling point of the solvent. As a result, the polymerization reaction can be aged. To achieve such a polymerization temperature, adjustment by dropwise addition of solvent, cooling of outer bath, stirring speed and the like is preferable. The third polymerization reaction is desirably carried out generally at 2-48 hr (preferably 12-30 hr, more preferably 12-24 hr).

The polymerization reaction can be carried out in two steps of the first and the second polymerization reactions. In this case, the first polymerization reaction is carried out until the reaction becomes moderate at a temperature higher than the 10 hr half-life temperature and lower than the boiling point of the solvent, and then, the second polymerization reaction is carried out at a temperature higher than the first polymerization reaction and lower than the boiling point of the solvent generally for 2-48 hr (preferably 4-30 hr, more preferably 4-16 hr).

Specifically, an example where AIBN or BPO is used as an initiator and ethyl acetate is used as a solvent is used for explanation. When the polymerization reaction is controlled in 3 steps, for example, the first polymerization reaction is desirably carried out at 50-59° C. (preferably 52-58° C.) for 1-5 hr (preferably 2-4 hr), then the second polymerization reaction is carried out at 60-70° C. (preferably 60-64° C.) for 5-10 hr (preferably 4-8 hr) and the third polymerization reaction is carried out at 71-80° C. (preferably 73-78° C.) for 10-48 hr (preferably 10-30 hr, more preferably 12-30 hr, still more preferably 12-24 hr). When the polymerization reaction is controlled in 2 steps, for example, the first polymerization reaction is desirably carried out at 55-65° C. (preferably 56-60° C.) for 1-10 hr (preferably 2-8 hr) and then the second polymerization reaction is carried out at 71-80° C. (preferably 73-78° C.) for 10-48 hr (preferably 10-30 hr, more preferably 12-30 hr, still more preferably 12-24 hr).

In the aforementioned polymerization reaction, a monomer comprising (meth)acrylic acid alkyl ester as a main component and containing a vinyl monomer is used. As the (meth) acrylic acid alkyl ester, methyl(meth)acrylate, ethyl(meth) acrylate, propyl(meth)acrylate, isopropyl(meth)acrylate, n-butyl(meth)acrylate, isobutyl(meth)acrylate, n-hexyl (meth)acrylate, n-octyl(meth)acrylate, isooctyl(meth)acrylate, 2-ethylhexyl(meth)acrylate, nonyl(meth)acrylate, decyl meth)acrylate, lauryl(meth)acrylate, stearyl(meth)acrylate and the like can be mentioned. Of these (meth)acrylic acid alkyl esters, those where the alkyl group has 4-12 carbon atoms are preferable, those where the alkyl group has 4-8 carbon atoms are more preferable, and 2-ethylhexyl (meth) acrylate is particularly preferable. They can be used alone or in a combination of two or more kinds thereof.

As the vinyl monomer, 2-hydroxyethyl(meth)acrylate, 2-hydroxypropyl (meth)acrylate, 2-hydroxybutyl acrylate, 2-hydroxybutyl (meth)acrylate, (meth)acrylic acid, maleic acid, crotonic acid, itaconic acid and the like can be mentioned, with preference given to 2-hydroxyethyl(meth)acrylate and (meth)acrylic acid. They can be used alone or in a combination of two or more kinds thereof.

As a constituent unit of copolymer, a monomer copolymerizable with the aforementioned (meth)acrylic acid alkyl ester and vinyl monomer may be further contained. As such monomer, amide group-containing monomers represented by N-vinyl-2-pyrrolidone, (meth)acrylamide, dimethylacrylamide etc., vinyl esters represented by vinyl propionate, vinyl acetate etc., vinyl ethers represented by vinylmethylether, vinylethylether, vinylbutylether etc., (meth)acrylonitrile, styrene and the like can be mentioned. They can be used alone or in a combination of two or more kinds thereof. Of these, N-vinyl-2-pyrrolidone is preferable in that it has a cyclic amide structure, which can be copolymerized with (meth) acrylic acid alkyl ester to increase polarity of the adhesive, which in turn enables provision of an adhesive superior in the solubility of polar drug. In addition, an adhesive can be improved in cohesion due to the presence of a hydrogen bond between amide bonds, and the hydrophilicity can be advantageously improved.

The amount of the (meth)acrylic acid alkyl ester to be added is not less than 50 wt %, preferably 50-80 wt %, of the total weight of the monomer, in view of the aspects of adhesion, irritation to the skin, variety of species and the like. The amount of the vinyl monomer to be added is preferably 1-10 wt %, more preferably 2-8 wt %, of the total weight of the monomer, in view of the improved adhesion and cohesion. When a monomer unit such as N-vinyl-2-pyrrolidone and the like is contained, the amount thereof is preferably 10-40 wt %, more preferably 20-30 wt %, of the total weight of the monomer, in view of the improved cohesion of the adhesive and the like.

The adhesive of the present invention may contain a plasticizer and a crosslinking agent for the purpose of removing the aforementioned inconveniences. As the plasticizer, one controlling the adhesiveness, one having an absorption enhancing effect, one improving the stability of a drug and the like are preferably used. As the plasticizer, for example, glycols such as ethylene glycol, diethylene glycol, triethylene glycol, polyethylene glycol, propylene glycol, polypropylene glycol and the like, esters such as isopropyl myristate, isotridecyl myristate, ethyl laurate, ethyl oleate, diisopropyl adipate and the like, surfactants such as sorbitan trioleate and the like, hydrocarbons such as liquid paraffin and the like can be mentioned, and one which is liquid at normal temperature to 30° C. is preferable. As the crosslinking agent, multifunctional isocyanate compound, epoxy compound, melamine compound, and polyvalent metal chelate compound can be mentioned. Of these, multifunctional isocyanate compound and polyvalent metal chelate compound are preferable in view of handleability and fine reactivity. When the adhesive contains a crosslinking agent, a copolymer and a crosslinking agent can form a crosslinking structure in the adhesive layer by a heat treatment etc. and sufficient cohesion can be achieved and cohesive failure and the like can be prevented more certainly.

As the multifunctional isocyanate compound, multifunctional isocyanate compounds such as tolylene diisocyanate (TDI), 2,4-tolylene diisocyanate dimer, naphthylene-1,5-diisocyanate (NDI), o-tolylene diisocyanate (TODI), diphenylmethane diisocyanate (MDI), triphenylmethane triisocyanate, tris-(p-isocyanatephenyl)thiophosphite, polymethylenepolyphenyl isocyanate can be mentioned, with preference given to triphenylmethane triisocyanate and the like, in view of good reactivity. They can be used alone or in a combination of two or more kinds thereof. In addition, the multifunctional isocyanate compounds are commercially available and, for example, CORONATE L, CORONATE HL, MILLIONATE MR-300 (all of which are manufactured by Nippon Polyurethane Industry Co., Ltd.) can be preferably used.

The polyvalent metal chelate compound refers to a compound wherein a polyvalent metal is covalently bonded or coordinately bonded to an organic compound. As the polyvalent metal atom, Al, Zr, Co, Cu, Fe, Ni, V, Zn, In, Ca, Mg, Mn, Y, Ce, St, Ba, Mo, La, Sn, Ti and the like can be mentioned. Of these, Al, Zr and Ti are preferable. As the atom in the organic compound to be covalently bonded or coordinately bonded, an oxygen atom and the like can be mentioned. As the organic compound, alkyl ester, alcohol compound, carboxylic acid compound, ether compound, ketone compound and the like can be mentioned. Specifically, titanium chelate compounds such as titanium dipropoxide-bis(acetylacetonate), titanium dibutoxide-bis (octyleneglycholate), titanium dipropoxide-bis (ethylacetoacetate), titanium dipropoxide-bis(lactate), titanium dipropoxide-bis(triethanolaminate), titanium di-n-butoxide-bis (triethanolaminate), titanium tri-n-butoxide monostearate, butyltitanate dimer, poly(titanium acetylacetonate) and the like; aluminum chelate compounds such as aluminum diisopropoxide monoethylacetate, aluminum di-n-butoxide monomethylacetoacetate, aluminum di-i-butoxide monomethylacetoacetate, aluminum di-n-butoxide monoethylacetoacetate, aluminum di-sec-butoxide monoethylacetoacetate, aluminum triacetylacetonate, aluminum triethylacetoacetonate, aluminum mono-acetylacetonate bis (ethylacetoacetate) and the like; and zirconium chelate compounds such as zirconium tetraacetylacetonate and the like are exemplarily shown. Of these, aluminum triacetylacetonate and aluminum dipropoxide monoacetylacetonate are preferable. They can be used alone or in a combination of two or more kinds thereof.

Moreover, the content of the plasticizer is preferably 10-130 parts by weight, more preferably 20-120 parts by weight, still more preferably 30-100 parts by weight, particularly 20-70 parts by weight, especially 30-60 parts by weight, per 100 parts by weight of the copolymer. When the content of the plasticizer is too small, the adhesive force tends to be too high, and when it is too high, the adhesive force tends to be too low or cohesion tends to become insufficient. The content of the crosslinking agent is preferably 0.1-1 part by weight, more preferably 0.3-0.7 part by weight, still more preferably 0.3-0.5 part by weight, per 100 parts by weight of the copolymer. When the content of the crosslinking agent is too small, the crosslinking density tends to decrease and sufficient strength cannot be obtained easily, and when it is too high, the adhesive force tends to decrease and workability during production tends to be degraded.

When the adhesive contains 100 parts by weight of a plasticizer and 0.3-0.7 part by weight (preferably 0.3-0.5 part by weight) of a crosslinking agent, per 100 parts by weight of the copolymer, a laminate obtained by forming an adhesive layer on a support using the adhesive can show, after a heat treatment at 70° C. for 48 hr, a retention time of not less than 1000 min as measured by the following method (A). When a laminate is produced using such adhesive, cohesive failure and the like can be prevented more certainly.

(A) A laminate after heat treatment is cut to give a test piece (width 10 mm, length 50 mm), 10 mm from one end of the test piece in the longitudinal direction is adhered to a bakelite plate and pressed by one reciprocation of a rubber roller (0.85 kg), a 2.94 N (0.3 kgf) load is applied to the tip of the other end at 40° C. in the shear direction, and the time until the test piece falls off due to cohesive failure or interfacial failure is measured.

The adhesive of the present invention can be preferably used for pharmaceutical use and can contain various drugs. As the drug, for example, coronary vasodilator, hormones, antiphlogistic, anti-inflammatory agent, tranquilizer, raw materials used for stimulants, narcotic analgesic, antihypertensive agent, antibiotics, antibacterial agent, antiepileptic agent, anti-histamine agent and the like can be mentioned. Moreover, where necessary, the adhesive of the present invention can also contain additives such as tackifier, filler, antioxidant, UV absorber and the like as appropriate. The content of the drug is preferably 1-40 parts by weight, more preferably 1.5-25 parts by weight, per 100 parts by weight of the adhesive.

The laminate of the present invention is now explained.

FIG. 1 is a sectional view of the laminate of this embodiment. A laminate 10 has a support 1 made of a soft material and an adhesive layer 3 formed on at least one side of the support 1. The adhesive layer 3 consists of the aforementioned adhesive of the present invention.

The support 1 retains the adhesive layer 3 and one having appropriate flexibility is selected therefor because when, for example, adhered to the skin, it needs to follow movements of the skin, and when adhered to a bendable surface, it needs to adapt to the bending movement without causing foreign sensation. For example, films and porous films of polyethylene or polytetrafluoroethylene, films of polyester, polyurethane, ethylene-vinyl acetate resin, non-woven fabric, woven fabric, paper, metal foil and the like and laminates thereof can be used. While the thickness of the support 1 varies depending on the object of use, it is generally about 0.02-0.5 mm, preferably about 0.02-0.2 mm. In addition, the support 1 may undergo various treatments such as an antistatic treatment, a primer coating treatment and the like, as necessary. The thickness of the adhesive layer 3 of the laminate 10 is, for example, about 5-500 μm, preferably about 10-200 μm.

The adhesive layer 3 may contain additives as necessary, such as the aforementioned drugs, plasticizer, crosslinking agent and the like and, for example, a laminate containing a desired additive can be obtained by applying an adhesive solution containing an additive onto the support 1 and drying the solution. For application of the adhesive solution, for example, coating techniques employed for the production of adhesive tapes can be directly used. When the adhesive layer 3 consists of an adhesive containing 100 parts by weight of a plasticizer and 0.3-0.7 part by weight (preferably 0.3-0.5 part by weight) of a crosslinking agent, per 100 parts by weight of the copolymer, a laminate 10 after a heat treatment at 70° C. for 48 hr shows a retention time of not less than 1000 min as measured by the above-mentioned method (A). As a result, a laminate 10 that prevents cohesive failure etc. more certainly can be obtained.

As the embodiment of the laminate 10, moreover, an adhesive sheet, an adhesive tape, an elongated surgical tape and the like can be mentioned. They can be produced by a conventionally known method. An adhesive sheet can be produced, for example, by applying an adequate amount of the aforementioned adhesive solution to a support 1, and drying the solution by heating, or applying an adhesive solution to a release paper, drying the solution by heating, and adhering the resulting paper to a support 1. For protection of the adhesive layer 3, a release film (release liner) may be laminated on the adhesive layer 3. In addition, an adhesive tape can be produced, for example, by forming an adhesive layer 3 on one surface of a support 1, and taking up the laminate with the surface of the adhesive layer 3 facing the other surface of the support 1 to give a roll. A back surface treatment layer may be formed on the other surface of the support 1 by a conventional method such as coating and the like.

EXAMPLES

The examples of the present invention are explained in detail in the following, which are not to be construed as limitative.

Example 1

In a 20 L stainless reaction apparatus were charged 2-ethylhexyl acrylate (2850 g, 2-EHA: manufactured by TOAGOSEI CO., LTD.), acrylic acid (150 g, AA: manufactured by TOAGOSEI CO., LTD.), benzoyl peroxide (6 g, BPO: manufactured by Mitsui Toatsu Chemicals Inc.), and ethyl acetate (750 g, manufactured by Wako Pure Chemical Industries, Ltd.), and $N_2$ substitution was performed for 3 hr at outer bath temperature 40° C., stirring rate 30 r/min, nitrogen gas ($N_2$) 400 mL/min. Then, ethyl acetate (9250 g) for dropwise addition was prepared in a titration vessel. Thereafter, the outer bath temperature, rate of dropwise addition of ethyl acetate and stirring rate were controlled and polymerization reaction was carried out at an inner bath temperature of 56±2° C. for 2 hr, at 60±2° C. for 8 hr, and at 74±2° C. for 20 hr. After the completion of the polymerization reaction, the entire amount of ethyl acetate remaining in the titration vessel was added dropwise and the inner bath was cooled to not more than 40° C. to give a solution of copolymer (A). Subsequently, 100 parts by weight of isopropyl myristate per 100 parts by weight of copolymer (A) and a crosslinking agent shown in Table 1 were added, and the viscosity of the solution was adjusted with ethyl acetate to give an adhesive solution.

Example 2

Copolymer (A) was obtained in the same manner as in Example 1, 100 parts by weight of isopropyl myristate per 100 parts by weight of copolymer (A) and a crosslinking agent shown in Table 1 were added, and the viscosity of the solution was adjusted with ethyl acetate to give an adhesive solution.

Example 3

In the same manner as in Example 1 except that 2-hydroxyethyl methacrylate (2-HEMA: manufactured by KYOEISHA CHEMICAL CO., LTD.) was used instead of AA in Example 1, and the initial polymerization temperature was controlled to 60±2° C., copolymer (B) was obtained. Then, 100 parts by weight of isopropyl myristate per 100 parts by weight of copolymer (B) and a crosslinking agent shown in Table 1 were added, and the viscosity of the solution was adjusted with ethyl acetate to give an adhesive solution.

Example 4

In a reaction vessel similar to the one used in Example 1 were charged 2-EHA (2160 g), N-vinyl-2-pyrrolidone (750 g, NVP: manufactured by GOKYO TRADING CO., LTD.), AA (90 g), azobisisobutyronitrile (6 g, AIBN: manufactured by Wako Pure Chemical Industries, Ltd.) and ethyl acetate (7000 g), and polymerization was conducted in the same manner as in Example 1. Then, this solution was applied to a release liner such that the thickness after drying was 100 μm, dried with a hot air circulation type dryer at 100° C. for 10 min to remove the residual monomer. The obtained copolymer (C) was dissolved in ethyl acetate again to give a copolymer (C) solution. Then, 100 parts by weight of isopropyl myristate per 100 parts by weight of copolymer (C) and a crosslinking agent shown in Table 1 were added, and the viscosity of the solution was adjusted with ethyl acetate to give an adhesive solution.

Example 5

Copolymer (C) was obtained in the same manner as in Example 4, 100 parts by weight of isopropyl myristate per 100 parts by weight of copolymer (C) and a crosslinking agent shown in Table 1 were added, and the viscosity of the solution was adjusted with ethyl acetate to give an adhesive solution.

Comparative Example 1

In the same manner as in Example 1 except that the amount of ethyl acetate initially charged was 4500 g and the amount of ethyl acetate for dropwise addition was 5500 g, a copolymer (A2) solution was obtained. Then, 100 parts by weight of isopropyl myristate per 100 parts by weight of copolymer (A2) and a crosslinking agent shown in Table 1 were added, and the viscosity of the solution was adjusted with ethyl acetate to give an adhesive solution.

Comparative Example 2

A solution of copolymer (C2) was obtained in the same manner as in Example 4 except that the amount of AIBN was 12 g. Then, 100 parts by weight of isopropyl myristate per 100 parts by weight of copolymer (C2) and a crosslinking agent shown in Table 1 were added, and the viscosity of the solution was adjusted with ethyl acetate to give an adhesive solution.

Comparative Example 3

Copolymer (C2) was obtained in the same manner as in Comparative Example 2, 100 parts by weight of isopropyl myristate per 100 parts by weight of copolymer (C2) and a crosslinking agent shown in Table 1 were added, and the viscosity of the solution was adjusted with ethyl acetate to give an adhesive solution.

Comparative Example 4

Preparation of Adhesive D

A commercially available adhesive 87-2196 (manufactured by National Starch and Chemical Company) was used as it was. From the catalog of this product, it is assumed that copolymer (D) constituting the adhesive contains at least 2-EHA and AA as monomer units. Then, 100 parts by weight of isopropyl myristate per 100 parts by weight of copolymer (D) and a crosslinking agent shown in Table 1 were added, and the viscosity of the solution was adjusted with ethyl acetate to give an adhesive solution.

Comparative Example 5

Preparation of Adhesive D
100 parts by weight of isopropyl myristate per 100 parts by weight of commercially available copolymer (D) used in Comparative Example 3 and a crosslinking agent shown in Table 1 were added, and the viscosity of the solution was adjusted with ethyl acetate to give an adhesive solution.

Comparative Example 6

A commercially available adhesive 87-2516 (manufactured by National Starch and Chemical Company) was used as it was. From the catalog of this product, it is assumed that copolymer (E) constituting the adhesive contains at least 2-EHA, and 2-HEMA or 2-hydroxyethyl acrylate as monomer units. Then, 100 parts by weight of isopropyl myristate per 100 parts by weight of copolymer (E) and a crosslinking agent shown in Table 1 were added, and the viscosity of the solution was adjusted with ethyl acetate to give an adhesive solution.

(Measurement of Molecular Radius Rz and Absolute Molecular Weight Mw)

Using a multi angle laser light scattering detector (MALLS), Rz and Mw were determined by conventional methods. To be specific, several concentrations of THF dilute solutions of each sample were prepared, Zimm plots were drawn by the microbatch method and using the following apparatus under the following conditions and Rz and Mw were determined. The measurement results are shown in Table 1.

1) Apparatus and conditions
•dn/dc measurement
interference refractometer: Wyatt Technology, OPTILAB DSP
wavelength: 633 nm (W lamp)
detector: RI (40° C.)
eluent: special grade THF
flow rate : 1-2 mL/min (natural flow) •GPC/MALLS
GPC: Shodex, SYSTEM•21
MALLS detector: Wyatt Technology, DAWN DSP-F
column: stainless tube inner diameter 0.25 mm, length 80 cm
(GPC column was not used)
column temperature: 35° C.
eluent: THF
flow rate: 0.70 mL/min
injection volume: 4 mL
line filter: 1.0 μm
laser wavelength: 632.8 nm
multi angle fitting method: Berry method (Measurement of Retention Time)

Respective adhesive solutions obtained in Examples 1-3 and Comparative Examples 1-6 were applied to 75 μm thick polyester liners such that the thickness after drying was 60 μm, and they were dried in a hot air circulation type dryer at 100° C. for 3 min. A 12 μm polyester film was laminated on the exposed surface of the adhesive layer after drying, tight sealed with a polyester packaging material and heat treated at 70° C. for 48 hr to give respective test tapes.

The prepared tape was cut to give a test piece (width 10 mm, length 50 mm), 10 mm from one end of the test piece was adhered to a bakelite plate and pressed by one reciprocation of a rubber roller (0.85 kg), a 0.3 kg weight was applied to the tip of the other end at 40° C. in the shear direction, and the time until the test piece fell off due to cohesive failure or interfacial failure was measured. The measurement results are shown in Table 1.

(Evaluation of Residual Adhesive Substance)

After the measurement of the retention time, the test piece was removed from the bakelite plate, and the surface of the adhesive layer was adhered strongly to the ball of a finger. The presence of adhesive residue remaining on the ball of a finger after removal of the test piece from the finger was evaluated by a functional test. The test results are shown in Table 1.

TABLE 1

| | copolymer | crosslinking agent | amount of crosslinking agent added[3] | RZ (nm) | Mw (×10$^6$) | retention time (min) | residue |
|---|---|---|---|---|---|---|---|
| Ex. 1 | A | C/HL[1] | 0.3 | 155 | 2.6 | >1000 | none |
| Ex. 2 | A | AL[2] | 0.4 | 155 | 2.6 | >1000 | none |
| Ex. 3 | B | C/HL | 0.5 | 103 | 1.9 | >1000 | none |
| Ex. 4 | C | C/HL | 0.3 | 83 | 1.8 | >1000 | none |
| Ex. 5 | C | AL | 0.4 | 83 | 1.8 | >1000 | none |
| Com. Ex. 1 | A2 | C/HL | 0.5 | 52 | 1.6 | >1000 | found |
| Com. Ex. 2 | C2 | AL | 0.5 | 48 | 1.0 | 750 (interfacial failure) | found |
| Com. Ex. 3 | C2 | AL | 0.7 | 48 | 1.0 | >1000 | found |
| Com. Ex. 4 | D | AL | 0.5 | 40 | 1.3 | 850 (interfacial failure) | found |
| Com. Ex. 5 | D | AL | 0.7 | 40 | 1.3 | >1000 | found |
| Com. Ex. 6 | E | C/HL | 0.5 | 64 | 7.6 | 250 (interfacial failure) | — |

[1] trifunctional isocyanate (CORONATE HL, manufactured by Nippon Polyurethane Industry Co., Ltd.)
[2] aluminum triacetylacetonate (manufactured by Kawaken Fine Chemicals Co., Ltd.)
[3] parts added to 100 parts by weight of acrylic copolymer in the adhesive solution This application is based on a patent application No. 2005-131670 filed in Japan, the contents of which are hereby incorporated by reference.

What is claimed is:

1. An adhesive used for pharmaceutical use comprising a drug and a copolymer obtained by copolymerizing monomers comprising a (meth)acrylic acid alkyl ester as a main component, and a vinyl monomer having a hydroxyl group and/or a carboxyl group and which has an average molecular radius of not less than 70 nm as measured by a multi angle laser light scattering method.

2. The adhesive of claim 1, wherein the (meth)acrylic acid alkyl ester is 2-ethylhexyl acrylate.

3. The adhesive of claim 1, wherein the vinyl monomer is 2-hydroxyethyl (meth)acrylate or (meth)acrylic acid.

4. The adhesive of claim 1, wherein the copolymer is obtained by copolymerizing monomers comprising not less than 50 wt % of (meth)acrylic acid alkyl ester, 10-40 wt % of N-vinyl-2-pyrrolidone, and 1-10 wt % of an acrylic acid.

5. The adhesive of claim 1, which comprises 100 parts by weight of a plasticizer and 0.3-0.7 part by weight of a crosslinking agent, per 100 parts by weight of the copolymer.

6. The adhesive of claim 5, wherein the crosslinking agent is a multifunctional isocyanate compound or a polyvalent metal chelate compound.

7. A laminate comprising a support made of a flexible material and an adhesive layer formed on at least one side of the support and comprising the adhesive of claim 1.

8. The laminate of claim 7, wherein the adhesive layer comprises 100 parts by weight of a plasticizer and 0.3-0.7 part by weight of a crosslinking agent per 100 parts by weight of the copolymer contained in the adhesive layer, and the retention time as measured by the following method (A) after a heat treatment at 70° C. for 48 hr is not less than 1000 min:

(A) a laminate after heat treatment is cut to give a test piece (width 10 mm, length 50 mm), 10 mm from one end of the test piece is adhered to a bakelite plate and pressed by one reciprocation of a rubber roller (0.85 kg), a 2.94 N (0.3 kgf) load is applied to the tip of the other end at 40° C. in the shear direction, and the time until the test piece falls off due to cohesive failure or interfacial failure is measured.

9. The laminate of claim 7, which is an adhesive sheet or an adhesive tape.

* * * * *